Dec. 26, 1933.    H. M. HAMER    1,941,300
VEHICLE SIGNALING DEVICE
Filed Nov. 4, 1929    2 Sheets-Sheet 1
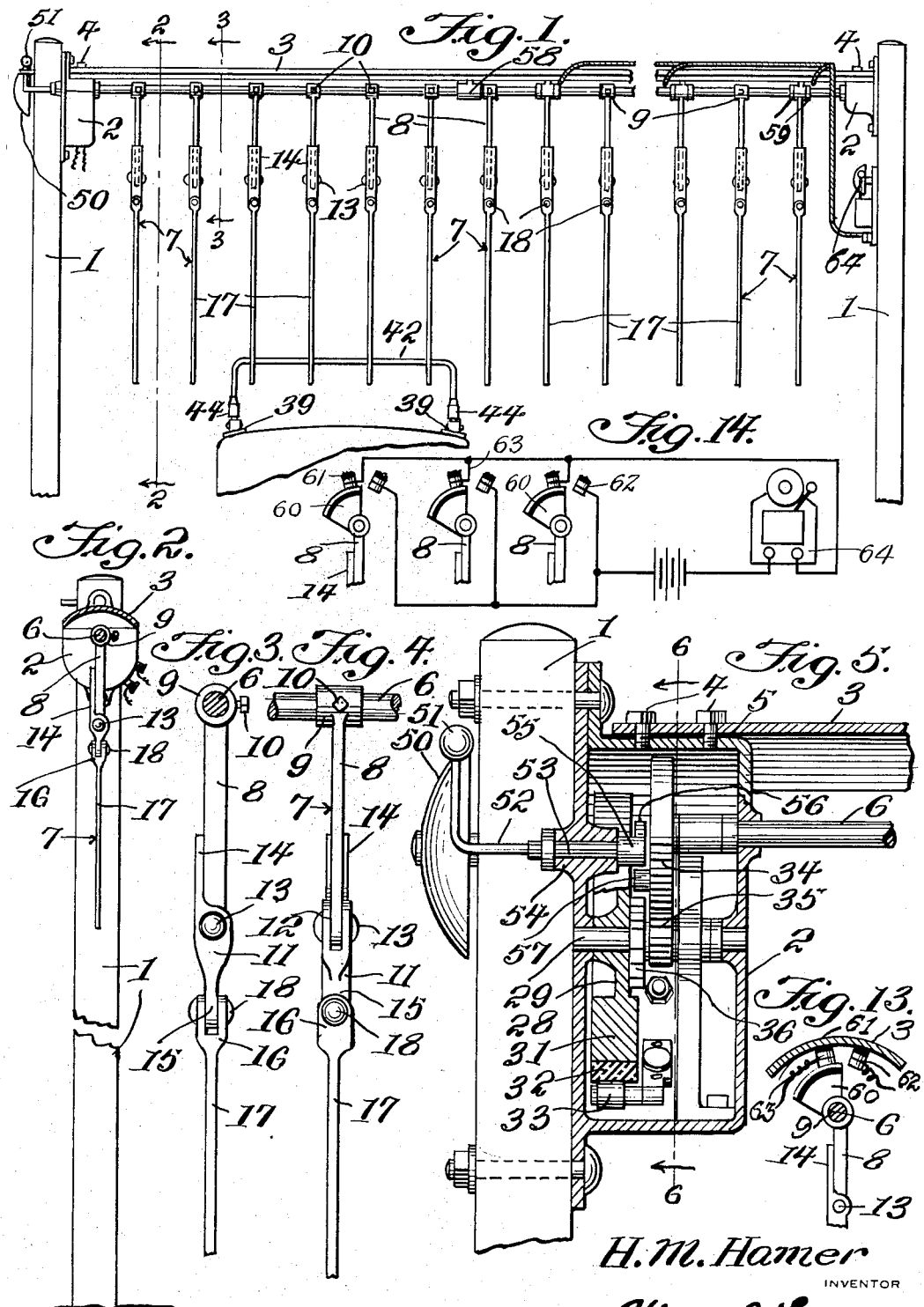
H. M. Hamer
INVENTOR
BY Victor J. Evans
ATTORNEY
WITNESS J. T. L. Wright Dec. 26, 1933.   H. M. HAMER   1,941,300
VEHICLE SIGNALING DEVICE
Filed Nov. 4, 1929   2 Sheets-Sheet 2
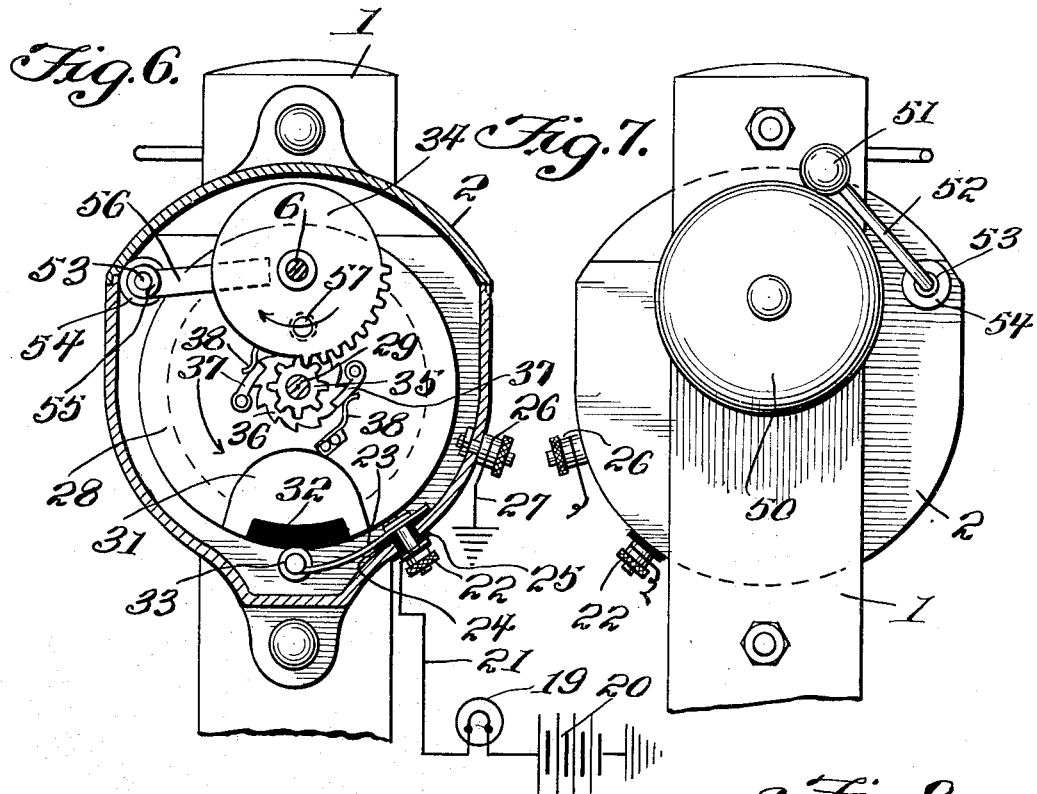
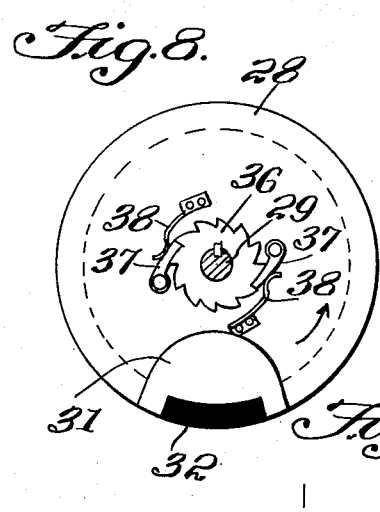
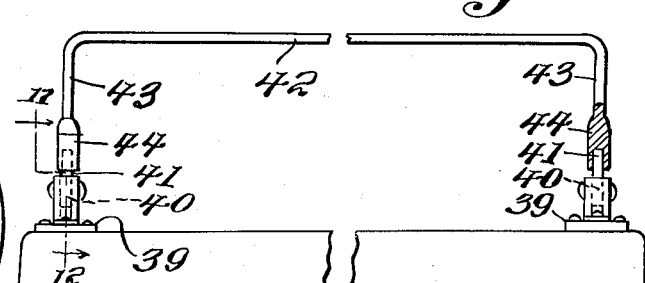
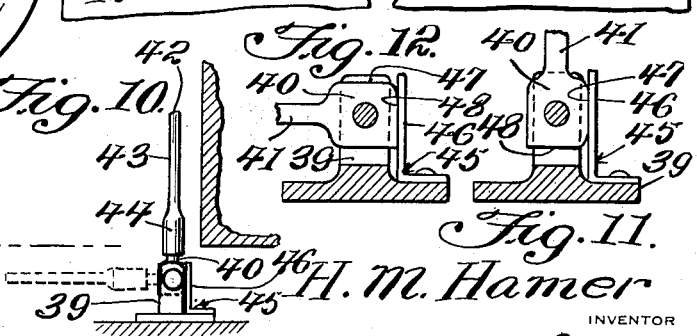
H. M. Hamer
INVENTOR
BY Victor J. Evans
ATTORNEY
WITNESS J. T. L. Wright Patented Dec. 26, 1933

1,941,300

UNITED STATES PATENT OFFICE 1,941,300

VEHICLE SIGNALING DEVICE

Harry M. Hamer, Johnstown, Pa.

Application November 4, 1929. Serial No. 404,712

1 Claim. (Cl. 177—311)

This invention relates to improvements in warning signals for installation on highways, and has as its general object to provide a signal for installation upon a highway in proximity to a cross road, a railway track crossing the highway, or a sharp curve in the highway, the device embodying means for automatically warning the motorist passing the same that he should use extreme caution.

Another object of the invention is to provide a signal device which will be efficacious both during day light and night hours, so that the same will at all times be of use.

Another object of the invention is to so construct the warning or signal device that it will be actuated to give a signal regardless of whether the approaching automobile is being driven along the right or wrong side of the highway, as for example, by carelessness, or in passing another vehicle, the device being further so constructed that it will not be actuated to give a signal to automobiles which have passed the crossing, curve, or railway track, so that it will offer no cause for confusion to automobile drivers travelling in the direction opposite the direction in which the signal would be rendered active.

Another object of the invention is to provide a signal which will give warning to motorists driving their automobiles on the wrong side of the highway.

This invention also consists in certain other features of construction and in the combination and arrangement of the several parts, to be hereinafter fully described, illustrated in the accompanying drawings, and specifically pointed out in the appended claim.

In describing my invention in detail, reference will be had to the accompanying drawings wherein like characters denote like or corresponding parts throughout the several views, and in which:—

Figure 1 is a view in elevation of the signal apparatus embodying the invention, the view also illustrating a part of the apparatus, which is carried by automobiles.

Figure 2 is a vertical sectional view taken substantially on the line 2—2 of Figure 1 looking in the direction indicated by the arrows.

Figure 3 is a view taken substantially on the line 3—3 of Figure 1 looking in the direction indicated by the arrows.

Figure 4 is a view in elevation taken in a plane at right angles to the plane of Figure 3.

Figure 5 is a vertical sectional view through the signal actuating means of the apparatus.

Figure 6 is a vertical transverse sectional view taken substantially on the line 6—6 of Figure 5.

Figure 7 is a side elevation of the signal actuating mechanism.

Figure 8 is a detail view, in elevation of a fly wheel constituting a part of the signal actuating means.

Figure 9 is a view in front elevation of the unit of the apparatus which is installed upon the automobile.

Figure 10 is a sectional view illustrating, in a schematic manner, the manner in which the unit shown in Figure 9 will be displaced when the automobile, equipped with the unit, is drven through the doorway of a garage, or striking any other overhead obstruction.

Figure 11 is a detail vertical sectional view on the line 11—11 of Figure 9.

Figure 12 is a detail vertical sectional view on a plane at right angles to the plane of Figure 11.

Figure 13 is a detail view similar to Figure 2 illustrating a circuit closing means for giving a warning signal to drivers on the wrong side of a highway.

Figure 14 is a view showing a plurality of said circuit closing means in parallel in a normally open circuit with a source of electric energy and a signal, the latter being shown as of bell type.

That portion of the apparatus which is installed at intervals along a highway in proximity to curves, crossings, and intersecting railway tracks, comprises a pair of upright posts 1, which are mounted at the opposite sides of the highway, and the numeral 2 indicates a casing which is mounted upon the upper end portion of each post at that side of the post which is presented toward the highway. A transversely arched shield, indicated by the numeral 3 is riveted or otherwise secured as indicated by the numeral 4, at its ends, to the upper sides of the casings 2 and as one of the casings houses a circuit closing means for the signal circuit, a sheet 5 of insulating material is interposed between this end of the shield 3 and the upper side of said casing as shown in Figure 5 of the drawings. This shield constitutes a protective cover for a shaft 6, which is journalled at its ends in bearing openings formed in the closed ends of the casings 2 which are presented toward the highway.

This shaft constitutes a hanger for a plurality of suspended impact units which are indicated by the numeral 7, and each of these units comprises an arm 8 which is provided at its upper end with a collar 9 fitting the said shaft 6 and secured thereto by a set screw 10. The numeral 11 indicates a knuckle which is recessed at one side, as indicated by the numeral 12 so as to receive the lower end of the respective arm 8 and a pivot pin 13 is engaged through the knuckle and through the said lower end of the arm 8 so that the knuckle may have swinging movement about the pivot pin 13 in one direction, its swinging movement in the opposite direction being prevented by providing, at the upper end of the knuckle, an abutment extension 14 which is transversely curved at its inner side to engage against the side of the respective arm 8. Each knuckle is provided with a portion 15 which extends downwardly below the pivot 13, and is engaged between ears 16 formed at the upper end of an impact arm 17, and a pivot pin 18 is engaged through said ears and through the lower end of the said portion 15, and at this point, it will be observed and particularly by reference to Figures 3 and 4 of the drawings, that the pivots 13 and 18 have their axes at right angles to each other. In this manner the impact arms 17 are suspended in vertical position in a row at equi-distantly spaced intervals through the series and, due to the right angular disposition of the pivot pins 13 and 18, impact against the arms 17 in the line of extent of the highway will, if delivered by the impact unit upon the automobile, which unit will presently be described, cause swinging movement of the arm 17 due to the engagement of the abutment portion 14 of the knuckle 11 with the said arm 17, and this will effect rotation of the shaft 6 so as to elevate all of the said arms 17, the arms being all secured to the said shaft. Impact delivered at the opposite side of any of the arms will not produce this result but the arms will be merely swung to yield to the impact. It will be evident that due to the peculiar relative disposition of the pivots 13 and 18, the impact arms 17 are capable of lateral swinging movement, in the event the automobile should swerve toward either side of the highway at the time of passing the signal apparatus, thus avoiding damage to the said arms and the parts which suspend the same.

At a distance in advance of the signal device and in the direction of the crossing or intersection, or curve, there is mounted a signal light, which is shown in Figure 6 of the drawings, and is indicated by the numeral 19 and this electric light bulb is supplied with current from a battery 20 located upon the support for the light, the negative pole of the battery being grounded in any suitable manner, a conductor wire 21 leads from the other terminal of the light 19 and is connected to a binding post 22 mounted substantially at the under side of the casing 2 and this binding post likewise secures in place, within the casing, one end of a spring contact finger 23, a piece of insulation 24 being arranged between the wall of the casing and the said end of the contact finger and an insulating bushing 25 being preferably arranged in the opening through which the binding post screw is fitted.

Another binding post indicated by the numeral 26, is likewise mounted upon the wall of the casing adjacent the binding post 22, and a conductor wire 27 is connected to this post and may be either led to the ground or, if a battery, rather than current from a source of electric power supply, is employed, this wire may be connected to the negative pole of the battery. The numeral 28 indicates a fly wheel, which is rotatably mounted upon a shaft 29 journalled in the side walls of the casing 2, and this fly wheel is increased in thickness at a point in its circumference to provide a counter-weight, indicated by the numeral 31 and fitting in a recess formed in the outer side of the counterweight and in the periphery of the fly wheel, is an insert 32, of insulating material. The spring contact finger 23 supports, at its free end, a contact roller 33 which, in the normal positions of the parts, rests in engagement with the said insert 32 of the fly wheel 28, and as these parts are of metal, the fly wheel is, of course, in circuit with the ground binding post 26 of the casing, and it will be understood that when the fly wheel is rotated so that the insulation insert 32 moves out of contact with the roller 33 and the roller is engaged by the periphery of the fly wheel, the circuit will be closed through the signal light 19.

In order to effect rotation of the fly wheel 28, when the shaft 29 is rotated, a segmental gear 34 is mounted upon the adjacent end of the shaft 6, and the teeth of this gear mesh with a pinion 35, which is fixed upon the shaft 29, and a ratchet wheel 36 is fixed upon the shaft 29 and pawls 37 are pivoted upon the face of the fly wheel 28 and are held in engagement with the ratchet wheel 36 by means of leaf springs 38.

It will now be evident that when the shaft 6 is rotated in the direction indicated by the arrow in Figure 6 of the drawings, the pinion 35 and ratchet wheel 36 will be rotated in the direction indicated by the arrow, and this will impart rotary motion to the fly wheel 28 in the reverse direction. The impetus thus imparted to the fly wheel will cause its rotation for a part of a revolution, and therefore the insulation insert 32 upon the fly wheel will ride out of circuit with the contact roller 33, and the circuit will be closed through the signal light 19.

In order that, when an automobile passes the suspended impact arms 17, these arms may be engaged or impacted so as to cause them to swing to effect rotation of the shaft 6 for a part of a revolution an impact unit, shown most clearly in Figures 9, 10 and 11 of the drawings, is provided. This unit comprises a pair of bearings 39 which are mounted at the opposite sides of the forward portion of the top of the automobile, and in each of these bearings there is pivotally mounted a flat sided head 45 at the lower end of an arm 41.

The arm 41 upstands from the outer end of each shaft 40 and an impact bar 42 is provided at its ends with downwardly extending arms 43, which are in turn provided at their lower ends with sockets 44, which are frictionally fitted to the upper ends of the arms 41, and in order that this impact member may be supported in an upright position, a strong leaf spring 45 is mounted upon the top of the automobile and has an upstanding part 46 adapted to engage either of two straight sides 47 and 48 of the head 40, the spring engaging the side 47 when the arm 41 is in upright position as shown in Figure 12 and holding the arm in this position, and, engaging the side 48 when the arm is swung downwardly as shown in Figure 11. It will be understood that when the arm 41 is swung from one position to the other, the rounded corner between the said sides of the head will ride against the portion 46 of the spring 45. The impact member 42, being mounted through the medium of the sockets 44, which engage the upper ends of the arms 41, may be separated from the arms in the event an overhanging tree limb should become entangled in the said impact member and in such event no damage would be caused to the top of the automobile.

It will also be understood by reference to Figure 10 of the drawings that when the automobile is driven into a garage, the impact unit comprising the member 42 and its associated parts, may yield in the manner shown in broken lines in this figure as it comes in contact with the top of the door frame.

The driver of an automobile approaching the crossing, intersection, or curve, adjacent which the apparatus of the invention is installed, will be apprised of this fact by the energization of the light signal 19 as his automobile passes the impact arms 17, and the impact member 42 upon his automobile strikes these arms and may further exercise proper care in approaching the crossing, intersection, or curve. In order that drivers driving at an excessive rate of speed, and who might be too careless to observe the light signal 19, may be warned of their approach to the crossing or intersection or curve, an audible signal, in the nature of a bell 50 is mounted upon the upright 1 upon which the casing 2 is also mounted, and a clapper 51, for the bell, is carried at the outer end of an arm 52, which extends from one end of a shaft 53, mounted in a bearing 54, in one wall of the casing 2, a collar 55 being fixed to the inner end of this shaft and having an arm 56, extending radially therefrom to be engaged by a stud 57 projecting from one side of the segmental gear 34 and, while, when actuated by an automobile travelling at a normal rate of speed, the fly wheel 28 and therefore the segmental gear 34 will only be rotated a part of a revolution, such actuation by an automobile travelling at an excessive rate of speed will impart such impetus to the fly wheel 28 and therefore to the segmental gear as to cause the said stud to engage the arm 56 and thus sound the bell 50.

Preferably a bearing 58 is mounted upon the under side of the shield 3 midway between the ends thereof, for the shaft 6, or, if desired, a number of such bearings may be provided at intervals throughout the length of the shoulder and shaft so as to prevent any distortion or swinging of the shaft, and it will be understood that the shield constitutes not only a means for protecting the shaft and the parts supported thereby from rain and snow, but also as an effective brace between the posts 1 so as to prevent any distortion of these posts, such as might result from warping of the same.

It will be understood that the counter weight 30 of the fly wheel 28 will serve to rotate the wheel and restore the same to its normal position and that, at this time the other parts will, likewise, be restored to their normal positions.

In order that motorists may be warned when they are driving on the wrong side of a highway, the collars 9 from which the arms 8 of alternate ones of the impact units which are located at one side of the intermediate bearing 58 for the shaft 6, are not fixed with respect to the shaft but are loosely mounted thereon between other collars 59 which latter are fixed upon the shaft, and these collars are provided each with a contact segment 60; Figures 13 and 14, which is normally in contact, near one end, with a fixed contact 61 upon the underside of the arched shield 3, and, when any of the impact units is struck by the top or impact unit of an automobile travelling on the wrong side of the highway, the contact segment of the respective collar 9 will bridge the fixed contact 61 and a companion fixed contact 62, also mounted beneath the shield 3, thus closing a circuit through an electric signal bell 64 mounted upon the adjacent post 1. The circuit wire connected to the contact 61 is numbered 63, Figure 14 showing diagrammatically a plurality of pairs of contacts 60—62 in parallel in a normally open circuit which contains the signal 64 and a source of electric energy.

What I claim is:—

A signal comprising spaced supports, a shaft journaled to and extending between the supports, means for rotating the shaft by the passing of a vehicle, an electric signal, a conductive weighted off-balanced wheel having an insulating member, means for rotatingly mounting said wheel whereby its weighted part seeks a lowermost point in normal position, means for rotating said wheel by said shaft, circuit closing means engaging said insulating member when the wheel is in normal position, a source of electric energy, and a normally open circuit containing said source of energy and also containing connected in series said signal, wheel and circuit closing means, the means for rotating the wheel by relatively small rotation of the shaft closing said circuit by said closure means, said shaft also having a rotary tappet, a bell clapper having an arm operable by said tappet, and a bell means arranged to be struck by said clapper upon the relatively greater movement of said shaft.

HARRY M. HAMER.